United States Patent [19]

Kumm

[11] 4,223,535
[45] Sep. 23, 1980

[54] ABSORPTION SOLAR POWERED AIR CONDITIONING SYSTEM WITH STORAGE CAPACITY

[76] Inventor: Emerson L. Kumm, 1035 E. Laguna Dr., Tempe, Ariz. 85282

[21] Appl. No.: 972,539

[22] Filed: Dec. 22, 1978

[51] Int. Cl.³ .................... F25B 27/00; F25B 15/00
[52] U.S. Cl. ................................. 62/2; 62/148; 62/476; 165/48 S
[58] Field of Search ............. 62/2, 148, 476, 484, 62/489, 324 B, 238 B, 101, 112, 271; 165/45 S

[56] References Cited

U.S. PATENT DOCUMENTS

| | | | |
|---|---|---|---|
| 2,030,350 | 2/1936 | Bremser | 62/148 |
| 2,089,776 | 8/1937 | Wittmann | 62/271 |
| 2,210,496 | 8/1940 | Peltier | 62/101 |
| 2,795,115 | 6/1957 | Kumm | 62/148 |
| 2,802,344 | 8/1957 | Witherell | 62/101 |
| 3,276,217 | 10/1966 | Bourne et al. | 62/476 |
| 3,894,582 | 7/1975 | Stubblefield | 62/2 |
| 4,007,776 | 2/1977 | Alkasab | 62/2 |
| 4,070,870 | 1/1978 | Bahel et al. | 62/2 |
| 4,111,259 | 9/1978 | Lebduska | 62/2 |
| 4,127,009 | 11/1978 | Phillips | 62/101 |

*Primary Examiner*—Lloyd L. King
*Attorney, Agent, or Firm*—Charles E. Cates

[57] ABSTRACT

This air conditioning system includes low pressure water vaporization, transfer and absorption, both in a solution concentrating section using solar radiation or other heat input and in a solution diluting section where heat exchange with ambient fan blown air subsequently permits cooling or heating enclosure air. The fan blown enclosure air is cooled or heated in passing through the same heat exchanger by changing the flow paths of the solutions passing to and from the two unique vapor exchangers, which are described in detail. The solutions are separated but contained in a sealed system with storage volume to give a large heat capacity potential by changing the solution concentration to either cool or heat the enclosure air.

The various system operational modes are described in detail, with the functioning of the vapor exchangers and heat exchangers in concert with the flows through pipes and ducts as generated by pumps and fans together with control by valves.

7 Claims, 4 Drawing Figures

ABSORPTION SOLAR POWERED AIR CONDITIONING SYSTEM WITH STORAGE CAPACITY

BACKGROUND OF THE INVENTION

This invention relates generally to air conditioning systems and more particularly to systems utilizing solar energy for both heating and cooling enclosures.

The invention relates still more particularly to solar powered systems utilizing evaporation-absorption principles and falling generally in the class exemplified in part by the following patents: Nos.

2,030,350 to Bremser
2,210,496 to Peltier
2,795,115 to Kumm
3,276,217 to Bourne et al
3,894,582 to Stubblefield
4,007,776 to Alkasab
4,070,870 to Bahel et al Such patents are directed to refrigeration systems using some of the features of the subject systems, but none shows the arrangement or the method used herein to accomplish the objectives thereof, such as reduced size, high efficiency, economy of manufacture and operation, and large heating and cooling storage capability.

In the present commercial lithium bromide absorption refrigeration system, an evacuated drum or chamber is normally used wherein water is vaporized from a water spray in one section of the chamber and absorbed in the lithium bromide solution sprayed over water cooling coils in another section of the chamber. The vaporization of water from the water spray cools the remaining unvaporized water, allowing this water to be used subsequently to cool air passing into an air conditioned enclosure. The lithium bromide solution is pumped from the evacuated chamber and heated to vaporize the water that had been absorbed in flow through the chamber before passing back to the chamber. The evacuated chamber is very large compared to equipment in this invention due to requiring low vapor flow pressure loss with demisters to prevent liquid droplet transfer between the water sprays and the lithium bromide solution. A large amount of cooling water is also required for cooling the lithium bromide solution or a separate water cooling tower is necessary, recirculating the water and requiring attention and treatment to prevent salt buildup and corrosion. Lithium bromide is a relatively expensive salt so that it is impractical to consider storing large quantities of such a solution.

BRIEF DESCRIPTION OF THE INVENTION

I overcome the problems associated with the prior use of lithium bromide absorption refrigeration systems and extend the art to permit both heating and cooling of enclosure air as desired, using a strong salt solution, preferably a basic hydroxide water solution, in an absorption arrangement rejecting or absorbing heat to or from ambient air in an arrangement not heretofore practiced for similar purposes.

The arrangement uses two novel vapor exchangers to concentrate and dilute the strong salt solution which are very efficient and relatively small, permitting considerably economies in their manufacture. Tower packing having very large wetted area per unit volume is used in a unique fashion (as will hereafter be explained) in the vapor exchangers to give low operating pressure drops and large vapor flows in very compact configurations.

The resulting small size of the vapor exchanger as compared to present commercial absorption refrigeration systems also results in reducing the cost and amount of supporting structures, since the equipment containing liquids at vacuum are normally located on roofs to give a substantial liquid head, preventing cavitation in the required pumps at ground level.

The solutions in the system are recirculated through heat exchangers where heat is transferred to or from fan blown ambient air, thus not requiring the use of a large amount of cooling water or a separate water cooling tower. The solutions in the system are sealed from contact with atmospheric air, thus preventing contamination and operational difficulties. In a preferred embodiment a basic hydroxide solution is used which, being quite inexpensive, permits low cost storage of large quantities of concentrated solution to give a significant amount of air conditioning by changing the concentration of the stored solution without simultaneous supply of solar radiation or other heat, over a wide ambient air temperature range.

The storage of solar heat as currently practiced makes use of either a simple temperature increase in materials such as rocks or water or, in some cases, the heat of solution of certain salt hydrates such as sodium sulfate decahydrate. Heat storage by the concentration changes of the stored solutions as used in this invention does not need the amount of insulation or large volume required by the rock or water system or the containers and more complicated structure requirements of the heat of solution phase change salts. The heat storage using concentration changes of the stored solutions can obtain over a 100 BTU per pound of solution as used in this invention, thus resulting in the smallest volume to store a given amount of heat of any known solar heat storage system.

I provide a water vapor absorption system for use in heating and cooling the air of an enclosure. Said system employs a strong salt solution, a weak salt solution, storage means to contain and keep separate said solutions, a first and second vapor exchanger containing several vertical perforated structures with tower packing material, which are positioned in close but insulated proximity to each other, wherein said strong and weak solutions are introduced to alternate columns to wet the tower packing in concurrent gravity operated flow to obtain vapor transfer between the weak and strong solutions at a partial vacuum, by adjustment external to the vapor exchangers of the temperatures of said solutions. The system includes means for selectively obtaining heat exchange between the solutions and the enclosure air and between the solutions and atmoshperic air, involving pumps, fans, valves, piping, heat exchangers together with optional temperature controls for automatic operation. The system is sealed from atmospheric air and preferably would use sodium hydroxide in the strong solution and calcium or lithium chloride in the weak solution, with solar heating means supplemented by other means.

The method of selectively heating or cooling the air of an enclosure involes using the first vapor exchanger for concentrating the strong solution, storing and recycling said strong solution and using a second vapor exchanger for diluting the strong solution, said cooling of enclosure air being obtained from the weak cold solution from the second vapor exchanger, and said heating of enclosure air being obtained from either (i) the strong hot solution of the second vapor exchanger or (ii) the weak hot solution from the first vapor exchanger.

Other advantages of the invention will appear from the following description of the system selected for illustration in the accompanying drawings.

IN THE DRAWINGS

Figure 4:
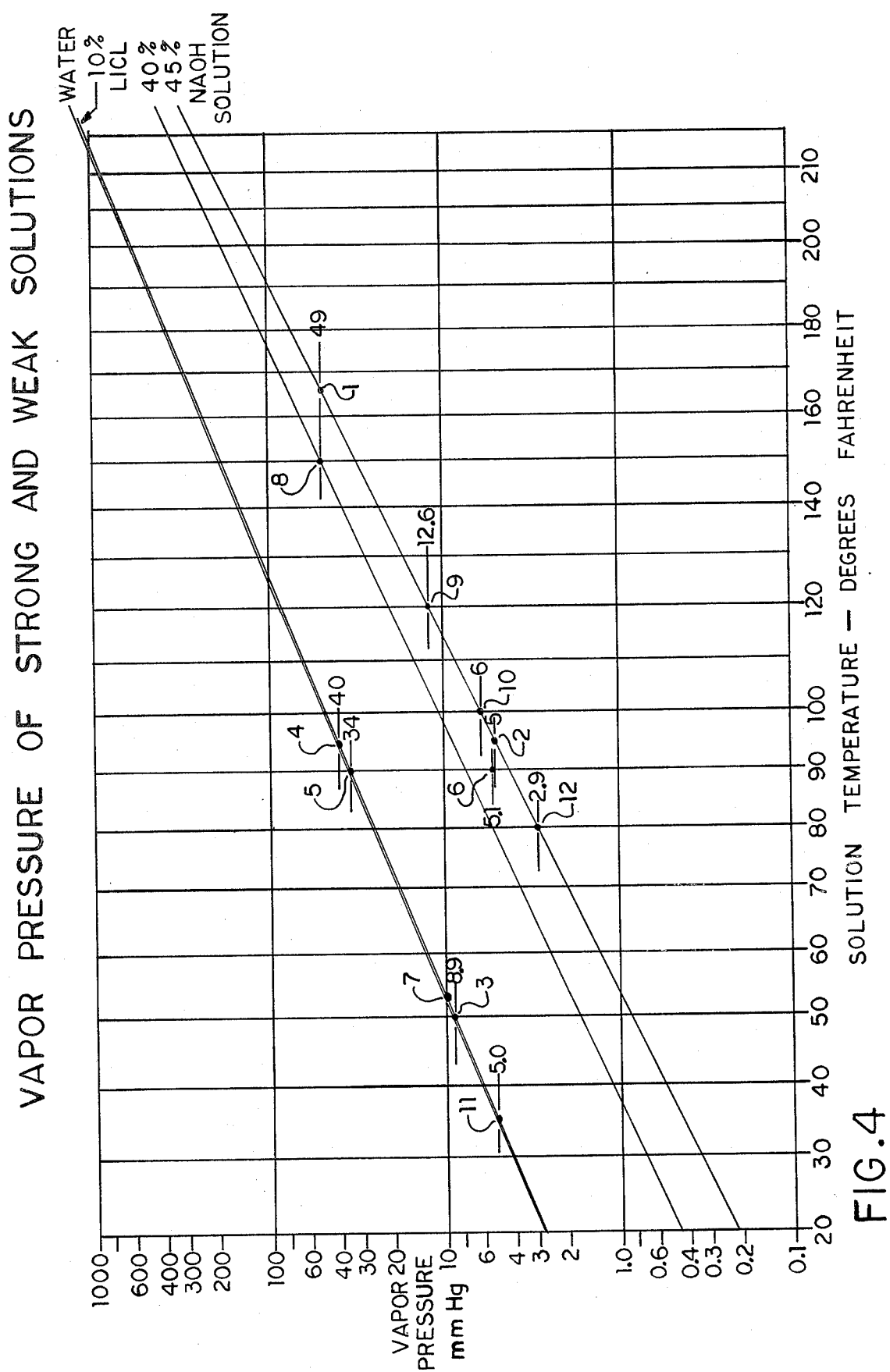

FIG. 4 gives the equilibrium vapor pressure of water of weak and strong solutions of various concentrations as a function of the solution temperature.

DESCRIPTION

Figure 1:
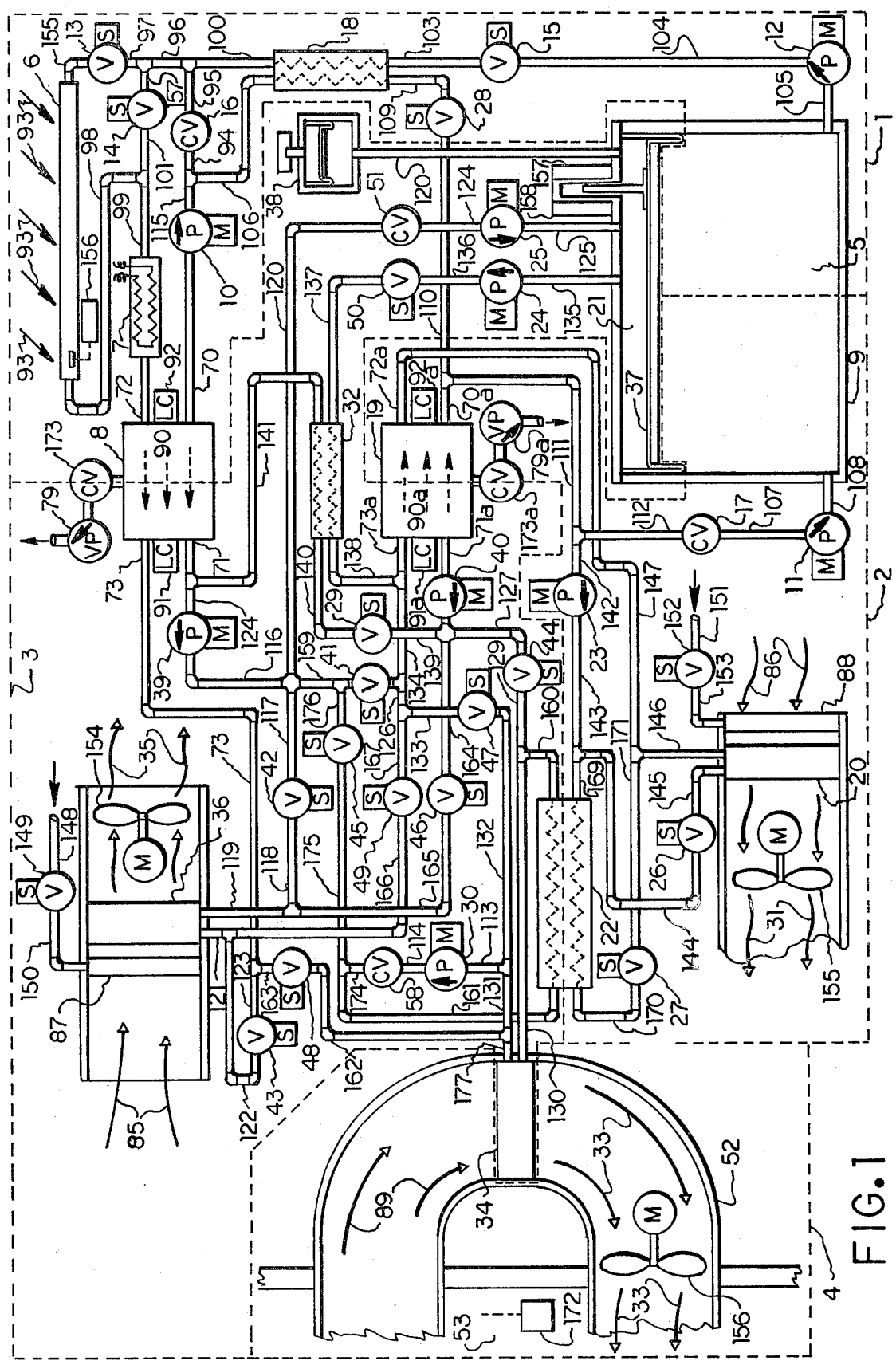
FIG. 1 is a combination schematic view of some of the equipment and a flow diagram of a system embodying the principles of the present invention.

Referring more particularly to the drawings, and especially FIG. 1, it will be observed that four main sections 1, 2, 3, and 4 make up the system. Section 1 contains the strong solution 5 which may be heated in solar heat collector 6 and/or electrical heater 7, concentrated by evaporation of water in vapor exchanger 8, stored in tank 9, transferred as described later by pumps 10, 12 through a plurality of valves 13, 14, 15, 16, 28, heat exchanger 18, and connecting lines. Section 2 contains likewise the strong solution 5 which may be diluted by absorption of water in vapor exchanger 19, cooled by ambient fan blown air 86 in heat exchanger 20, or cooled in heat exchanger 22, stored in tank 9, transferred as described later by pumps 11, 23, through a plurality of valves 17, 26, 27, and connecting lines. Section 3 contains a weak solution (or pure water) 21, from which water is vaporized in vapor exchanger 19, and to which water is absorbed in vapor exchanger 8, the weak solution 21 either being heated by enclosure fan blown air 89 in heat exchanger 34 or in another mode of operation heated by ambient fan blown air 85 in heat exchanger 36, or in still another mode of operation heated by the strong solution 5 in heat exchanger 22 and then cooled by enclosure fan blown air 89 in heat exchanger 34. The weak solution 21 of section 3 is stored in tank 9 and in expansion chamber 38 being separated from the strong solution 5 by an impermeable diaphram 37, transferred as described hereafter by pumps 24, 25, 30, 39, 40 through a plurality of valves 29, 41, 42, 43, 44, 45, 46, 47, 48, 49, 50, 51, 58, and connecting lines. Section 4 is composed of an air duct 52 which contains the recirculated air 33 blown by fan 156 to and from the enclosure 53 through the heat exchanger 34.

Figure 3:
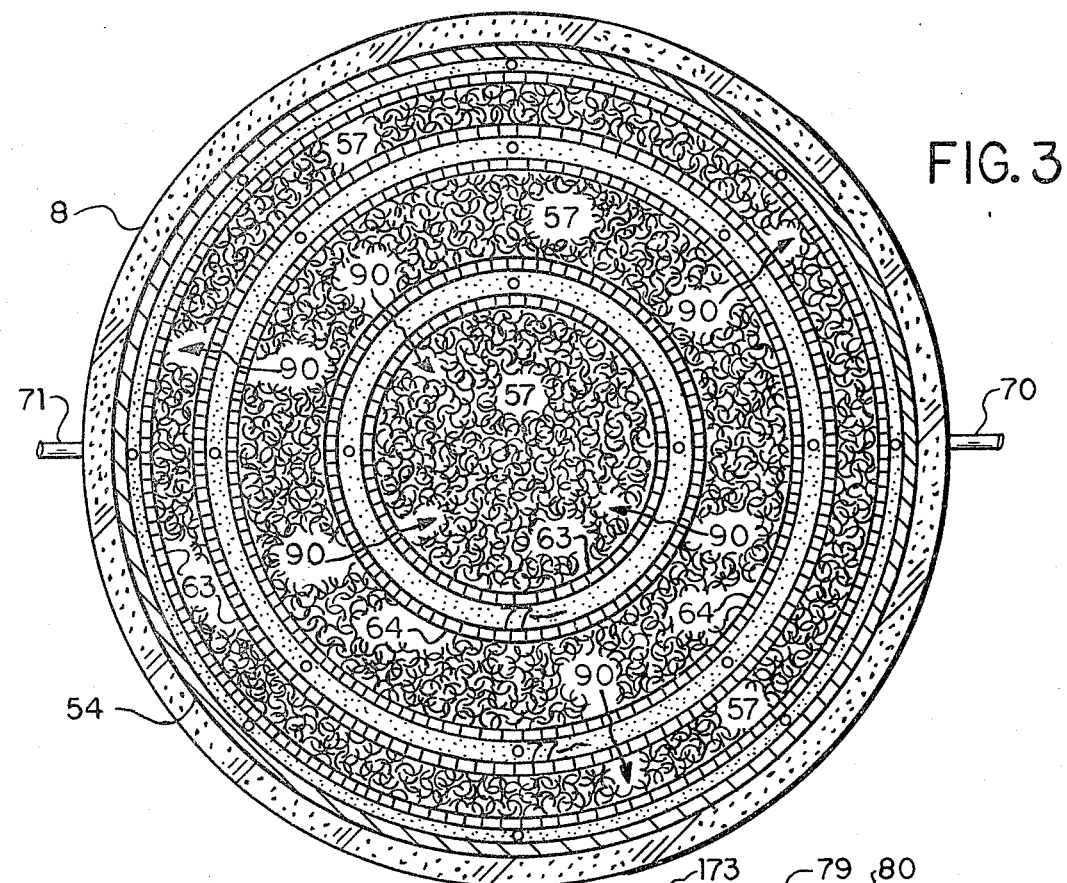
FIG. 2 and FIG. 3 are sectional views of a vapor exchanger as used in the flow diagram.
Figure 2:
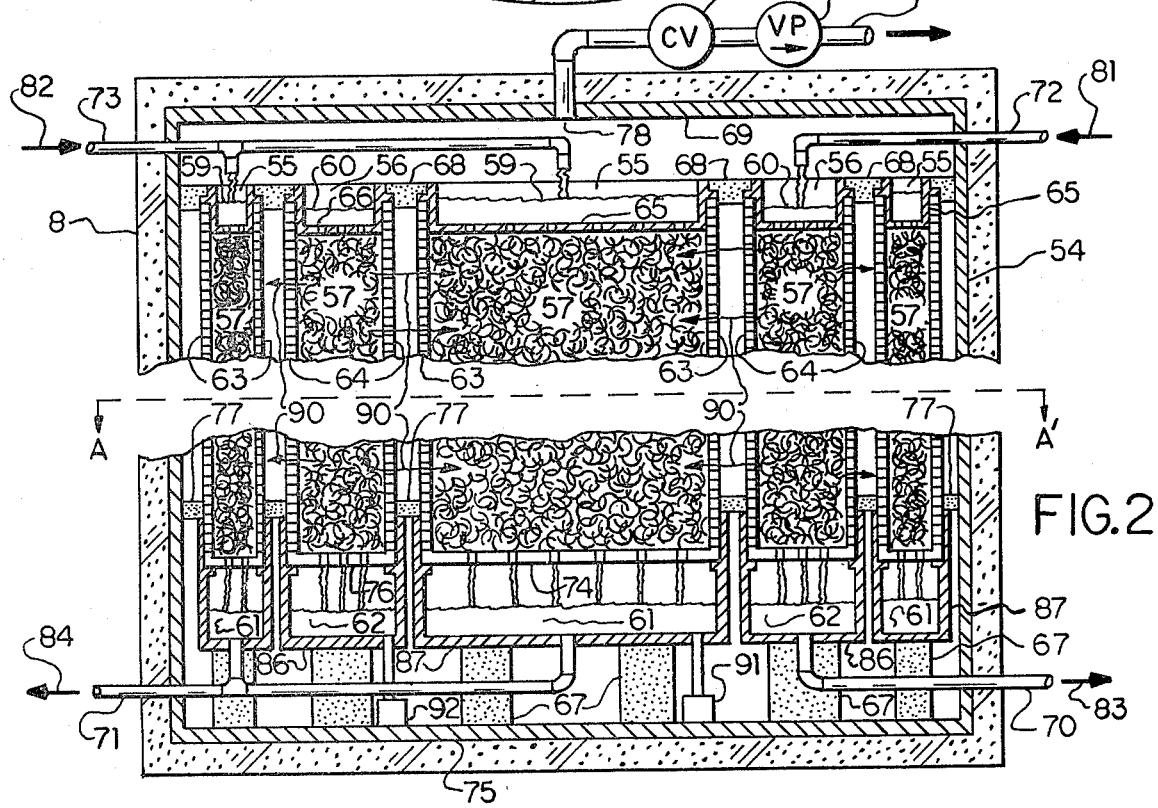

The operation of the system depends basically on the water vapor exchangers 8, 19, as shown in detail in FIG. 2 and 3. The vapor exchangers 8, 19 have the same construction comprising of a cylindrical casing 54, and end plates 69, 75 containing a plurality of vertical columns 55, 56, each containing tower packing 57 confined between perforated walls 63, 64. The strong solution 81 in pipe 72 discharges as solution fluid 60 into distributor sieve plate 66 and the weak solution in pipe 73 discharges as solution fluid 59 into distributor sieve plates 65. The tower packing 57 is supported in the vertical columns 55, 56 by open area grids 74, 76, supported in turn on the solution flow collectors 86, 87, supported in turn by low thermal conductivity insulators 67 supported on the bottom plate 75. The solutions 59, 60 flow down the columns 55, 56, wetting the packing 57 and discharging through grids 74, 76 into the collectors 87, 86, which are drained by pipes 71, 70, respectively. The vertical columns 55, 56 are held rigidly in close proximity to each other without touching by low thermal conductivity spacers 68, 77, near the top and bottom, respectively, of the columns 55, 56. The spacers 68, 77 do not block completely the spaces in which they are located, so that gas pressure equalization may occur through the interior of the casing 54 and end plates 69, 75. The end plate 69 has an opening 78 leading to a pump 79 through check valve 173, the operation of which reduces the absolute pressure in the casing 54 in and around the columns 55, 56 by pumping out noncondensible gases.

In the system operation pipe 72 is supplied with the strong basic hydroxide solution 81 and pipe 73 is supplied with the weak solution 82. The fluids 81, 82 flow into the vapor exchanger 8, the strong basic hydroxide solution 81 and the weak solution 82 flow down alternate columns 55, 56, respectively, wetting the packing material 57 in each of the columns. In vapor exchanger 8 the temperature of the strong basic hydroxide solution 81 is sufficiently high that its water vapor pressure exceeds that of the weak solution 82, which flows into vapor exchanger 8 at a lower temperature. As a result of this difference between the water pressure of the weak and strong solution 81, 82, water 90 is vaporized from the strong solution 81 and condensed in the weak solution 82. The quantity of water 90 that is vaporized is comparatively large for the size of vapor exchanger 8 as employed. This is basically due to the very large wetted surface area per unit volume obtained with small size efficient tower packing material 57 and the very low overall operating pressure drop obtained by closely spacing the columns 55, 56 with a large fraction perforation area in column walls 63, 64, together with a high gas flow characteristic of the tower packing material 57. The vaporization of water from the strong basic solution 81, 60 in vapor exchanger 8 causes the remaining strong solution 62 to be further concentrated at the discharge 83 and to be cooled by the heat of vaporization of the water 90. Simultaneously, the weak solution 82, 59 into vapor exchanger 8 is diluted by the absorption of water at the discharge 61, 84 and is heated by the heat of absorption and sensible vapor heat due to temperature change. Hence, vapor exchanger 8 acts to concentrate and cool the strong solution 81 circulated to it and to dilute and heat the weak solution 82 circulated to it by pumping systems to be decribed later.

Vapor exchanger 19, which has the same structure as vapor exchanger 8, uses flows in pipes 72a, 73a, 83a, 84a at different temperatures to cause the resulting water vapor flow 90a to be reversed from the situation in vapor exchanger 8. The symbol "a" will be used to describe apparatus and flows in vapor exchanger 19 as compared to similar apparatus and flows in vapor exchanger 8. The strong solution 81a, supplied by pipe 72a, is at a temperature which gives an equilibrium water vapor pressure lower than that given by the weak solution 82a, supplied by pipe 73a. Hence, water is vaporized from the weak solution 59a in its vertical columns 55a, wetting the columns packing material 57a and passes as a vapor 90a through the perforated walls 63a, 64a to condense into the strong solution 60a, wetting the column packing material 57a in the vertical columns 56a. The weak solution 82a, 59a is cooled by the heat of vaporization of the water vapor 90a and made more concentrated as it passes through the vapor exchanger 19, while the strong solution 81a, 60a is made more dilute and heated by the heat of water condensation minus the sensible heat of the water vapor temperature change between the two solutions supplied by pipes 72a and 73a. Hence, vapor exchanger 19 acts to dilute and heat the strong solution 81a circulated through it and to concentrate and cool the weak solution 82a circulated through it by pumping systems to be described later.

Other structures as used typically in distillation, gas absorption and solvent extraction towers of the petroleum and chemical industries may also be employed in place of column packing material retained within peforated plates and wetted by liquids from sieve plate distributors. Such other structures include spray columns with demisters where the small droplet size gives a large vaporization area, bubble plate towers which use a multiplicity of vertically spaced horizontal plates with gravity flow of the liquid from one plate to another through pipes and sieve plate towers, where a multiplicity of vertically spaced horizontal perforated plates permit gravity flow of many small streams and droplets from one plate to another in a vertical column. Spray systems have been used in lithium bromide salt absorption refrigeration systems together with demisters to prevent entrainment of droplets in the water vapor flow. The difficulty of obtaining a very large volume of very small droplets geometrically close to another large volume of very small droplets without droplet transfer causes such systems to be much larger in volume than the preferred vapor exchanger system as described herein. Bubble plate and sieve plate towers are normally used with a vastly different counter flow of gas or vapor for absorption or concentration change in the down flowing mixture and do not involve the closely spaced thermally insulated columns with vapor cross flow containing alternately the two different solution concentrations as described here.

The pressure drop required for the water vapor flow 90, 90a from an evaporating to a condensing surface depends inversely on the flow path length according to experiment and theory as given by the following equation known as Stephan's law.

$$W = \frac{DP}{LRT} \ln \frac{P - P_1}{P - P_2} \quad (1)$$

W = weight flow of water vapor, lbs/ft²hr.
D = diffusion coefficient, water vapor in air, ft²/hr.
L = water vapor path length, evaporating to condensing surface, ft.
R = gas constant of water vapor, 85.8 ft lb/lb °R
T = water vapor temperature, degrees Rankine
P = total absolute pressure in casing, lbs/ft²
$P_1$ = equilibrium water vapor pressure at condensing surface, lbs/ft²
$P_2$ = equilibrium water vapor pressure at evaporating surface, lbs/ft²

The diffusion coefficient for water in air has been experimentally determined to be $$D = 0.892 P_o/P \, (T/T_o)^{1.81} \, \text{ft}^2/\text{hr} \quad (2)$$

$P_o$ = reference pressure (atmospheric), 2047.7 lbs/ft²
$T_o$ = reference temperature, 460 degrees Rankine Hence, by substituting equation (2) in equation (1), the ideal weight flow of water vapor may be obtained as $$W = \frac{0.892 \, P_o}{LRT} \left[ \frac{T}{T_o} \right]^{1.81} \ln \frac{P - P_1}{P - P_2} \, \text{lbs/ft}^2 \, \text{hr}$$

The actual water vapor flow is reduced by such items as change in liquid surface temperature due to the local cooling or heating accompanying the evaporation or condensation respectively of the water vapor as well as other flow pressure losses due to flow geometry—through perforated plates, etc.

The equilibrium water vapor pressure over solutions of various concentration is given for a preferred material, sodium hydroxide (NaOH) in FIG. 4 over a convenient temperature range. FIG. 4 shows that a 45% NaOH solution at 165 degrees F. has a water vapor pressure of 49 mm Hg, point 1, whereas a 10% lithium chloride (LiCl) solution at 95 degrees F. has a water vapor pressure of 40 mm Hg, point 4, thus giving a differential pressure of 49−40=9 mm Hg at the top of the vertical columns 55, 56 to transfer water from the strong solution 81, 60 in the vapor exchanger 8 when the solutions 81, 82 flow at such temperatures. As shown by equation (1) or (3), it is necessary to reduce the absolute pressure level in vapor exchanger 8 or 19, as close as practical to the maximum equilibrium water vapor pressure by removing non-condensible air gases, using the vacuum pumps 79 and 79a respectively to obtain the largest water vapor flow 90, 90a for a specific geometry system. As will be described later, a closed or sealed system is used that minimizes absorption of air in the solutions 81, 82, which then greatly reduces the operating requirement of the vacuum pumps 79, 79a. FIG. 4 also shows that a 45% NaOH solution at 95 F. has a water vapor pressure of 5 mm Hg, point 2, whereas the 10% LiCl solution at 50 degrees F. has a water vapor pressure of 8.9 mm Hg, point 3, thus giving a differential pressure of 8.9−5.0=3.9 mm Hg at the top of the vertical columns 55a, 56a to transfer water 90a from the weak solution 82a, 59a in the vapor exchanger 19 when the solutions 81a, 82a flow at such temperatures. Thus it may be perceived that the vapor exchanger 8 can operate to concentrate the strong solution 81 and the vapor exchanger 19 can operate to dilute the strong solution 81a with the transfer of resulting 90, 90a water into and out of the weak solution 82, 82a, respectively. It will be shown later how this invention maintains the proper temperatures of the solutions 81, 82, 81a, 82a with the heating and cooling that occurs in the vapor exchangers 8, 19.

A conventional psychometric chart is used, as is customary in air conditioning, to calculate the air temperature used to cool the strong solution 83, 83a in heat exchangers 36, 20 respectively, as used in one operating mode (cooling enclosure air 89 on a hot day operation). The psychrometric chart permits calculating to what temperature ambient air may be cooled using direct water evaporation into the air flow 85, 86 with evaporators 87, 88, respectively. Dependent on the relative humidity of the ambient air, the temperature of the air flows 85, 86 may be reduced by various amounts to more effectively cool the strong solution 83a in heat exchanger 20 and cool the weak solution 84 in heat exchanger 36, as desired in the hot day operating mode. This is explained more completely later.

The system as shown in FIG. 1 provides for six principal modes of operation, with two auxiliary modes using a backup heater or three modes for the hot day and three modes for the cold day conditions to which an enclosure may be subjected. These modes of operation are outlined below and will be referred to subsequently by the appropriate symbols, i.e. II, A. 2. being cold day operation with heating of enclosure air without the use of a heat supply by diluting the strong solution 5 contained in storage tank 9.

I. Hot Day Operation
  A. Cooling Enclosure Air
    1. With Heat Supply (solar radiation and/or other heat)
    2. Without Heat Supply (diluting strong solution)
  B. Not Cooling Enclosure Air
    1. Concentrating Strong Solution (solar radiation and/or other heat)
II. Cold Day Operation
  A. Heating Enclosure Air
    1. With Heat Supply (solar radiation and/or other heat, over 160 F. solution temperature)
      a. Concentrating Strong Solution
      b. Without Concentration Change
    2. Without Heat Supply (diluting strong solution)
  B. Not Heating Enclosure Air
    1. Concentrating Strong Solution (solar radiation and/or other heat)
III. Backup Heater Operation
  A. Cooling Enclosure Air
  B. Heating Enclosure Air The variation to be expected in the strong solution concentration depends on the amount of strong solution 5 or the storage volume in tank 1 relative to the equipment size in the remainder of the system. Thus, a large storage tank 9 of strong solution 5 used in a system will operate with a smaller change in concentration than the same system using a smaller storage tank under both heating and cooling operating modes. The specific concentration at any time of the strong solution 5 will depend on the previous operating history.

Thus, for operating mode I. A. 1, assume a 10% lithium chloride (LiCl) weak solution and a strong solution 81 of 45.0% NaOH at an ambient air temperature of 100 F. at 30% relative humidity. FIG. 4 shows that a 45.0% NaOH solution temperature of 165 F., point 1, has a water vapor pressure of 49 mm Hg. Using a psychrometric chart, assuming an 80% factor of approach to the dew point gives a cooling air flow 85, 86 at heat exchangers 36, 20 of 79.6 F. temperature. With heat exchangers 36, 20 designed to be 75% effective, the weak solution 82 can be cooled to 90 F. from 93 F. with reasonable flows, giving an inlet weak solution water vapor pressure of about 34 mm Hg, point 5. Thus the vapor exchanger 8 as shown in FIGS. 2, 3 has an initial vapor pressure differential of 49−34=15 mm Hg. The strong solution 81a entering vapor exchanger 19 will have a concentration less than the concentration in strong solution 81 entering vapor exchanger 8, due to the direction of the water vapor flow 90, 90a in each of the vapor exchangers 8, 19 and the makeup flows supplied by pump 12. Typically, the concentration is 1.5% more in strong solution 81 relative to maintaining the temperature of strong solution 81a at 90 F. in the same way that the weak solution 82 was held to 90 F. Thus, the water vapor pressure of the strong solution 81a, at 43.5% and 90 F., is 5.10 mm Hg, point 6 on FIG. 4. Using a weak solution 82a, entering at 53 F. gives 10.0 mm Hg vapor pressure point 7, on FIG. 4, and leaving 84a at 50 F. gives 8.9 mm Hg vapor pressure. The strong solution 83a leaves at about 95 F. where its vapor pressure is 6.1 mm Hg. Thus the available pressure drop for water vapor transfer varies from 10.0−5.10=4.9 mm Hg to 8.9−6.1=2.7 mm Hg over the length of the vertical columns 55a, 56a. The surface area requirement for a specified amount of water vapor 90a transfer may then be calculated using Equation (3) and the size of the exchanger determined knowing the surface area per unit of occupied volume of the tower packing 57a. With the weak solution 82, 84 entering at 53 F. and leaving at 50 F., it can be used to cool enclosure air 89 (FIG. 1) from 78 F. to 58 F. with a reasonable size of heat exchanger 34 (effectiveness of 0.75). Referring to FIGS. 1, 2, 3 the flows can be specified for operating mode I. A. 1. as follows:

(a) In section 1, pump 10 operates to recirculate strong solution 83 via pipe 70, 115, 94, check valve (CV) 16, pipe 95, 96, 97, solenoid valve (SV) 13, pipe 155, through solar heat collector 6, pipe 98, 99, backup electrical heater 7, pipe 72 to vapor exchanger 8. Level control 92 acts at low level in solution collector 86 to turn on pump 12 and open SV 15, SV 28 which act overall to gradually increase the strong solution quantity in vapor exchanger 8. The flow of strong solution 5 occurs from tank 9 through pipe 105, pump 12, pipe 104, SV 15, pipe 103, recuperative heat exchanger 18, pipe 100 to mix into recirculated flow in pipe 96. A portion of the more concentrated strong solution 83, from vapor exchanger 8 also flows through pipe 70, pump 10, pipe 115, 106, recuperative heat exchanger 18, pipe 109, SV 28, pipe 110, to increase the level in solution collector 86a through pipe 70a. SV-14 is closed during this operating mode. At high level in solution collector 86, level control 92 acts to turn off pump 12 and close SV 15, SV 28. Continued operation of pump 10 with heat input in solar heat collector 6 (or backup heater 7) lowers the level in solution collector 86 to the low point at which the pump 12 is again turned on and SV 15, SV 28 are opened. Vapor exchanger 8 is operated at a low absolute pressure of about 49 mm Hg in the case above using vacuum pump 79. Level control 92 will operate pump 12, SV 15, SV 28 intermittently during this operation with pump 10 in continuous operation in this mode.

(b) In section 2, the level control 92a acts at high level in the solution collector 86a to turn on pump 11, thereby discharging some strong solution 83a from vapor exchanger 19 via pipe 70a, 111, 112, CV 17, pipe 107, pump 11, pipe 108 to storage tank 9. At low level in the solution collector 86a, the level control 92a acts to turn off pump 11. In the operating mode I. A. 1., strong solution is recirculated by pump 23 from vapor exchanger 19 via pipe 70a, 111, 142 and discharged through pipe 143, 144, SV 26, pipe 145, heat exchanger 20, pipe 146, 147, 72a back to vapor exchanger 19. SV 27 is closed in this operational mode. The temperature of the strong solution 83a determines largely the resulting temperature of strong solution 5 in tank 9—i.e., for the cited case, about 93 F. An external water supply is used via pipe 151, SV 152, pipe 153 to vaporize 88 to cool the ambient air flow 86 by direct vaporization to give lower temperature cooling air for heat exchanger 20. Fan 155 operates to give the desired air flow 86 to 31.

(c) In section 3, pump 39 is operated to recirculate the weak solution 84 from pipe 71, 124 through pipe 116, 117, SV 42, line 118, 119, through heat exchanger 36, pipe 121, 122, SV 43, pipe 123, 73 back to the vapor exchanger 8. SV 45, SV 41, and SV 48 are closed in this operating mode. Level control 91 acts at high level in solution collector 87 to turn on pump 25 intermittently as necessary to discharge the additional volume caused by condensed water vapor 90 in the weak solution 84 through pipe 71, 124, pump 39, pipe 116, 120, CV 51, pipe 124, pump 25 and pipe 125 to storage tank 9. The temperature of fluid 21 is substantially the temperature of the discharge 84 from the vapor exchanger 8 or 93 degrees F. in the example previously cited. Also, in section 3, pump 40 is operated to draw the weak solution 84a through pipe 71a and discharge it through pipe 127, SV 44, pipe 129, 130, heat exchanger 34, pipe 177, 131, 132, SV 47, pipe 133, 126, 134, 73a back to vapor exchanger 19. SV 46 and SV 49 are closed in this operating mode. The weak solution 84a is heated in passing through heat exchanger 34 from 50 to 53 F. while cooling the fan inlet air 89 from 78 F. to 58 F. in flow 33. As the level in weak solution collector 87a decreases, level control 91a turns on pump 24, and opens SV 50, and SV 29 to supply additional weak solution 21 to increase the fluid 61a in solution collectors 87a of the vapor exchanger 19. The additional weak solution 21 passes through pipe 135, pump 24, pipe 136, SV 50, pipe 137, heat exchanger 32, pipe 138, 73a to vapor exchanger 19. At the same time, since SV 29 is open weak solution 84a passes from pump 40 through pipe 139, SV 29, pipe 140, heat exchanger 32, pipe 141 to become part of the flow in pipe 124 to pump 39. An external water supply is used via pipe 148, SV 149, pipe 150 to vaporize 87 to cool the ambient air flow 85 by direct vaporization to give lower temperature cooling air for heat exchanger 36. Fan 154 operates to give the desired air flow 85 to 35.

(d) In section 4, enclosure air 89 in duct 52 is drawn by fan 156 through heat exchanger 34 and discharged to enclosure 53 as the flow 33. The enclosure air 89 is cooled typically from 78 F. to 58 F. in passing through heat exchanger 34 in this mode operation for the cited operating conditions.

In operating mode I. A. 2. no heat is supplied via the solar heat collector 6 or by the backup heater 7 to heat the flow 83 being recirculated by pump 10 to pipe 72. Consequently, no vaporization or condensation occurs in the vapor exchanger 8. However, vapor exchange does occur in vapor exchanger 19 which increases the strong solution 5 volume in storage tank 9 while the weak solution 21 becomes more concentrated and decreases in volume. This operating mode is typical of that required to cool enclosure air during hot cloudy days and hot nights. As such, a maximum ambient air temperature is assumed in this case to be 90 F. at 40% relative humidity, realizing that such an ambient condition normally gives a considerable reduction in the total enclosure heat loads as compared to the I. A. 1. mode. It is anticipated that the maximum variation in strong solution 5 concentration will be typically 45 to 40% NaOH giving corresponding specific gravity change of 1.476 to 1.429. Hence, assuming a tank containing 1,000 pounds of NaOH in solution results in the following volumes:

| NaOH (pounds) | Concentration NaOH (percent) | Water (pounds) | NaOH Solution 5 (Volume, gallons) |
|---|---|---|---|
| 1,000 | 40 | 1500 | 209.8 |
| 1,000 | 45 | 1222.2 | 180.5 |
| Net change | 5 | 277.8 | 29.3 |

The corresponding water volume change is 33.3 gallons so that 4.3 gallons change would be required in an expansion chamber 38 as connected to tank 9 through pipe 120. The gross cooling capacity of vaporizing 277.8 pounds of water is approximately 292,000 BTU, which is equivalent to obtaining 2 tons refrigeration continuously for about 12 hours system operating time without any external heat input. If, as shown in FIG. 1, the weak solution 21 and strong solution 5 are contained in the same tank 9 as separated by an impermeable diaphram 37, the concentration of the weak solution is directly related to the position of diaphram 37, assuming a filled tank. It is desirable to use a weak solution that permits using this system in the heating mode of operation to be described later at ambient air temperatures lower than the freezing point of water (32 F.). Certain salts and antifreeze liquids are well known for being able to depress the freezing point of water, but many also significantly decrease the water vapor pressure over the weak solution 21. However, with suitable corrosion inhibitors, low cost chlorides such as sodium or calcium chloride may be used in the weak solution. Lithium chloride is an excellent freezing point depressant since it has very little effect at low concentrations on the solution vapor pressure, yet a major effect on the solution freezing point, as shown below. Lithium chloride solutions have the following characteristics, the 10% concentration being shown on FIG. 4.

| LiCl % | Freezing Point °F. | Solution Water Vapor Pressure at 50° F. mm Hg |
|---|---|---|
| 0 | 32 | 9.20 |
| 5 | 23 | 9.05 |
| 10 | 9.3 | 8.74 |
| 15 | −10.5 | 8.35 |

Hence, using a 230 gallon tank 9, and expansion chamber 38 of 10 gallons capacity, the weak solution 21 may be assumed to have a volume of 25 gallons at 10% solution LiCl. This gives 220 pounds solution containing 22 pounds LiCl. The volume and concentration changes corresponding to the changes in NaOH concentration are then as follows:

| NaOH (percent) | NaOH Solution (gallons) | LiCl (percent) | LiCl Solution Freezing Pt. °F. | LiCl Solution (gallons) | LiCl (pounds) |
|---|---|---|---|---|---|
| 40 | 209.8 | 11.6 | 4 | 23.7 | 24.4 |
| 45 | 180.5 | 5.0 | 23 | 57.0 | 24.4 |
| Change 5 | 29.3 | | | 33.3 | 0 |

Since a shift to lower NaOH concentration will occur with less than solar heat input as is typical of winter operation, the weak LiCl solution can be expected to shift likewise to higher concentrations, giving a lower solution freezing point as needed for operation in colder ambients for heating modes—cold day operation—II. A. 1., II. A. 2., II. B. 1.. Hence, the water vapor pressure differentials available for operating in the I. A. 2. mode may be calculated as follows: With an 80% factor of approach to the dew point, ambient air 86 of 90 F., 40% RH may be cooled to 74.8 F., allowing strong solution 83a to be cooled from 92 F. to 89 F. in heat exchanger 20. The water vapor pressure of the strong solution 81a varies as follows:

| NaOH (Percent) | Temperature °F. | Water Vapor Pressure mm Hg |
| --- | --- | --- |
| 40 | 92 | 8.0 |
| 40 | 89 | 7.3 |
| 45 | 92 | 4.47 |
| 45 | 89 | 4.10 |

The weak solution water vapor pressure varies with temperature as follows:

| Temperature °F. | 10% LiCl Solution Vapor Pressure mm Hg |
| --- | --- |
| 58 | 11.8 |
| 55 | 10.5 |
| 53 | 9.9 |
| 50 | 8.75 |

Thus it is perceived that to achieve the previous operating water vapor pressure differentials as in I. A. 1. of 4.9 to 2.7 mm Hg, the operating temperature level of the weak solution increases to about the 58 to 55 F. versus the previous 53 to 50 F. level. Such a 5 F. difference will, using the same equipment with minimum NaOH concentration, cool the enclosure air 89 passing through heat exchanger 34 from 78 F. to about 61 F. instead of 78 F. to 58 F. Thus, using the same flows, the cooling capacity of the worst case 40% NaOH solution 5 is still about 85% of the I. A. 1. operating mode. In operating mode I. A. 2. the flows are as follows:

(a) In section 1, pump 12 is operated by LC 92 to maintain level in 86 by flow from tank 9 through pipe 105, 104, SV 15, pipe 103, heat exchanger 18, pipe 100, 96, 157, SV 14, pipe 101, 99, backup heater 7, pipe 72, vapor exchanger 8, pipe 70, pump 10, pipe 115, 106, heat exchanger 18, pipe 109, SV 28, pipe 110, 70a to solution collector 86a in vapor exchanger 19. SV-13 is closed during this mode of operation. No water vapor exchange occurs in vapor exchanger 8 in this operating mode but recirculating flow pump 10 is operated passing most of its discharge through pipe 115, 94, CV 16, pipe 95 to join the flow from pipe 100 into pipe 96 to pass as described previously through pipe 157, SV 14, etc. back to vapor exchanger 8. The pressure loss of the flow passing through pipe 157, SV 14 and pipe 101 is set equal to the pressure loss of the flow passing in mode I. A. 1. through pipe 97, SV 13, pipe 155, solar heat collector 6, pipe 98 back to pipe 99. This is necessary to permit balancing the flows through heat exchanger 18 which is critical to prevent any significant residual fluid heat loss from strong solution 83, particularly when operated in mode I. A. 1.

(b) Section 2 is operated in the same fashion as in mode I. A. 1.

(c) Section 3 is operated in the same fashion as in mode I. A. 1.

(d) Section 4 is operated in the same fashion as in mode I. A. 1.

Operating mode I. B. 1. will occur whenever the solar radiation 93 is sufficient to give a differential temperature with respect to ambient air in differential temperature control (DTC) 156 that is adequate to permit concentrating the strong solution 5 up to a desired maximum concentration, even though enclosure air cooling is not demanded. A smaller differential temperature with a less concentrated strong solution 5 will also cause mode I. B. 1. to be put into operation. The concentration of solution 5 is conveniently measured by the diaphragm level in tank 5, which moves down as the concentration of 5 increases, using a level sensor 157. Thus, no cooling of the enclosure air may be involved merely by operating section 1, 2, 3, and 4 identically as in mode I. A. 1., except that fan 156 blowing enclosure air 89 and fan 155 are not in operation. Hence, the weak solution 84a, passing through heat exchanger 34, is not heated and cools down to the temperature at which no more water vapor 90a passes in vapor exchanger 19. Then the concentrating of the strong solution 5 and diluting of the weak solution 21 that occurs in vapor exchanger 8 results in changing the concentration of strong solution 5 and weak solution 21 in tank 9, if solar radiation is available, to maximum desired concentration, as given by a level control 158. Level control 158 senses movement of diaphragm 37 caused by a reduction in the stored strong solution 5 and increases in the strong solution 5 concentration which corresponds to a decrease in the diaphragm 37 height. At the desired maximum design concentration, level control 158 operates to turn off all pumps and fans in this mode.

Cold day operation with heating of enclosure is accomplished with the same basic system components as the previously discussed hot day operations, using a different routing of the flows to permit the same enclosure heat exchanger 34 to be used in heating the fan blown enclosure air 89 that was previously used to cool the air 89.

Operating mode II. A. 1. a. will occur upon demand for heating enclosure air 89 as sensed by thermostat 172 whenever the differential temperature control (DTC) 156 gives a signal indicating adequate solar radiation is being received that could simultaneously concentrate strong solution 5, using sensor 157. Upon receiving an additional signal from sensor 158 that maximum concentration exists in strong solution 5, mode II. A. 1. b. may be put into operation.

In operating mode II. A. 1. a., the flow arrangement in section 3 is modified to use the weak solution 83 to heat the enclosure air 89 passing through heat exchanger 34. Referring to FIG. 4, assume a strong solution 81 having either a temperature of 150 F. with 40% NaOH concentration, point 8, or a temperature of 165 F. with 45% NaOH concentration, point 5, both using 40 F. ambient air temperature. Assume 10% LiCl weak solution 82 with the 40% NaOH solution 81 and 5% LiCl weak solution 82 with 45% NaOH 81, due to the closed system fluid storage. Then, the vapor pressure differentials in vapor exchanger 8 over the length of vertical columns 55, 56 would vary typically from 11 to 4 mm Hg with the 5% LiCl weak solution 82 and 12 to 5 with the 10% LiCl weak solution 82 to cause the weak solution 82 to increase in temperature from 92 F. to 95 F., and the strong solution 81 to decrease in temperature by 3 degrees F. The weak solution 84 at a temperature of 95 F. can then heat enclosure air 89 from about 67 F. to 87 F. with the same heat exchanger and flows as previously used to cool enclosure air 89 in the hot day operation. Thus, in operating mode II. A. 1. a., the strong solution 5 becomes more concentrated and the weak solution 21 less concentrated.

Specifically, the flows in mode II. A. 1. a. are identical in sections 1, 2, and 4 to those given in I. A. 1., except that fan 155 is not operated and SV 152 is not opened. In section 3 (FIG. 1) in mode II. A. 1. a., the weak solution 84 is withdrawn from vapor exchanger 8 through pipe 71, 124 by pump 39 and discharged through pipe 116, 159, 176, SV 45, pipe 175, 161, heat exchanger 22, pipe 160, 130, heat exchanger 34, pipe 177, 162, SV 48, pipe 163, 73 back to vapor exchanger 8. At the same time, in mode II. A. 1. a. the weak solution 84a is withdrawn from vapor exchanger 19 through pipe 17a, by pump 40 and discharged through pipe 164, SV 46, pipe 165, 119, heat exchanger 36, pipe 121, 166, SV 49, pipe 167, 126, 134, 73a back to vapor exchanger 19. However, in mode II. A. 1. a. fan 154 is not operated and the weak solution 82a decreases in temperature to the point that results in no water vapor transfer in vapor exchanger 19. Both SV 149, SV 152 are left closed in all heating air modes, since maximum temperature air 85, 86 is needed for heat exchangers 36, 20, respectively when used. In mode II. A. 1. a., as the weak solution 61 level in solution collectors 87 increases, level control LC 91 operates pump 25 to discharge weak solution 84 via pipe 120, CV 51, pipe 124 and pipe 125 to tank 9 to mix with weak solution 21. Level control LC 91a operates pump 24 at low level in solution collector 87a to withdraw weak solution 21 from tank 9 via pipe 135 and discharge through pipe 136, SV 50, pipe 137, heat exchanger 32, pipe 138, into the weak solution 82a, passing through pipe 73a into vapor exchanger 19. Also, level control LC 91a simultaneously at low level on solution collector 87a opens SV 29 to discharge a portion of weak solution 84a from pipe 139 to pipe 140, heat exchanger 32, pipe 141, to mix with weak solution 84 in pipe 124 and passing through pump 39. This arrangement of pumps and flows serves to keep the concentration of the weak solution substantially the same through all elements in which it flows or is collected. Also, heat losses are minimized by the proper balancing of flows through the recuperative heat exchanger 32.

Operating mode II. A. 1. b. may be started in various ways, i.e., the solar heat input may decrease so that the weak solution 84 discharged by pump 39 is too low in temperature to heat the enclosure air 89 adequately or the strong solution 83 concentration may increase to a point where again the weak solution 84 discharged by pump 39 is too low in temperature to heat the enclosure air 89 adequately. However, if there is still a demand for heating the enclosure air 89 as given by the thermostat control 172, mode II. A. 1. b. will be put into operation at lower solar heated strong solution 81 temperature by connecting the solution concentrator 8 and solution dilutor 19 flows together and by operating a pump 30 recirculating flow through heat exchangers 22 and 34. The heat in this case is supplied by the strong solution 83a from vapor exchanger 19, passing through heat exchanger 22. This then operates the overall system without change in solution concentrations.

Consider an operation in mode II. A. 1. b. which gives a strong solution 81 temperature of 120 F., which is to be used to heat the enclosure air flow 89. From FIG. 4 a strong solution concentration of 45% at 120 F. gives an initial equilibrium water vapor pressure of 12.6 mm Hg, point 9. This may be used with a weak solution 82 at 50 F., point 3 to give an initial vapor pressure differential of $12.6-8.9=3.7$ mm Hg in the solution concentrator 8. The weak solution 84 is then pumped through SV 41 to enter the solution diluter 19 as flow 82a at about 53 F., giving an initial equilibrium water vapor pressure of 10.0 mm Hg, point 7. With the strong 45% solution 81a entering at 100 F., point 10, this then gives an initial vapor pressure differential of $10.0-6.0=4.0$ mm Hg in the solution diluter 19. Thus, the strong 45% solution 83a would be pumped from the solution diluter at about 103 F. by pump 23 and circulated through heat exchanger 22. Pump 30 is then used to recirculate the weak solution through heat exchanger 22 and 34 to heat enclosure air 89 typically from 68 to 88 F.

Specifically, the flows in mode II. A. 1. b. are identical in sections 1 and 4 to those given in I. A. 1. However, in section 2 the strong solution 83a heated by absorption of water in passing through vapor exchanger 19 is withdrawn through pipe 70a, 111, 142 by pump 23 and discharged through pipe 143, 169, heat exchanger 22, pipe 170, SV 27, pipe 171, 147, 72a back to vapor exchanger 19. SV 26 is closed, preventing flow through heat exchanger 20. In section 3, the weak solution 84 heated by absorption of water in passing through vapor exchanger 8 is withdrawn through pipe 71, 124 by pump 39 and discharged through pipe 116, 159, SV 41, pipe 134, 73a to vapor exchanger 19 where the weak solution flow 82a is cooled by evaporation of water in passing through vapor exchanger 19. The weak solution 84a is withdrawn from vapor exchanger 19 through pipe 71a by pump 40 and discharged through pipe 164, SV 46, pipe 165, 119, heat exchanger 36, pipe 121, 122, SV 43, pipe 123, 73 back to vapor exchanger 8. SV 42, SV 45, SV 47, SV 48 and SV 49 are closed during this operation. Also, fan 154 is not operated and SV 149 is closed. At the same time, pump 30 recirculates the weak solution contained in heat exchanger 34 by withdrawing through pipe 177, 131, 113 and discharging through pipe 114, CV 58, pipe 174, 161, heat exchanger 22, pipe 160, 130 back to heat exchanger 34. As previously shown, such recirculation permits heating the enclosure air 89 due to the heat transfer in heat exchangers 22 and 34. LC 91 and LC 91a operate in the same fashion as in mode I. A. 1., or as in mode. II. A. 1. a.

In operating mode II. A. 2., enclosure air 89 is heated but no heat is supplied to the strong solution 81 by either the solar heat collector 6 or backup heater 7. This operating mode corresponds to cloudy day or night time operation on a cold day, when heating of the enclosure air is required. In this mode of operation the overall effect is to dilute strong solution 5, increasing its volume while the weak solution 21 becomes more concentrated or has less volume. Operating mode I. A. 2 generates a heated strong solution 83 a in vapor exchanger 19 by absorption of water from the weak solution 82a due to the water vapor pressure differential existing between the strong and weak solution. Consider a cold day ambient air temperature of 40 F., which would permit heating the weak solution 84a from 32 to 35 F. when passing through heat exchanger 36. At 35 F. the weak solution has a water vapor pressure of 5 mm Hg, FIG. 4, point 11, which permits heating a strong 45% solution 81a from 80 F., point 12, to about 83 F. This gives an initial water vapor pressure differential of 5.0−2.9=2.1 mm Hg. In heat exchanger 22 the weak solution may be heated from 77 to 80 F. to then permit heating the enclosure air 89 from 62 to 72 F. The amount of enclosure air heating possible in this operational mode is dependent on the ambient air temperature, lower ambient air temperatures resulting in lower temperature to which the enclosure air may be heated with the above case being typical. In this mode of operation the differential temperature control 156 and level sensor 157 will indicate inadequate solar radiation similar to operating mode I. A. 2. with the following result:

(a) In section 1 operation is identical with mode I. A. 2., with SV 14 open and SV 13 closed.

(b) In section 2 operation is identical with mode II. A. 1. b., SV 26 and SV 152 are closed in this mode.

(c) In section 3 operation is identical with operating mode II. A. 1. b., except that fan 154 is operated.

(d) In section 4 operation is identical with mode II. A. 1. b.

There are occasions on cold days when heating of the enclosure air is not required but sufficient solar radiation exits to permit using the solar heat collectors to concentrate the strong solution 5. This condition corresponds to operating mode II. B. 1. As in mode I. B. 1., this condition would be sensed by the differential temperature control 156, together with concentration sensor 157. Here operation would be identical to mode I. B. 1. in sections 1, 2, 3, 4, with the exception that SV 149, SV 152 are closed as always with cold day operation.

The backup heater 7 is employed instead of or in addition to the solar heat collector 6 in modes III. A., III. B., to permit the system to cool or heat the enclosure air when inadequate cooling or heating is available from the system, as previously desired. Thus, with hot day operation and demand for closure air to be cooled, if the desired enclosure temperature cannot be maintained, TC 172 will bring the backup heater 7 into operation and the system in mode III. A. will then function identically to I. A. 1. With cold day operation and demand for enclosure air to be heated, if the desired enclosure temperature cannot be maintained, TC 172 will, in mode III. B., bring backup heater 7 into operation and the system will function identically to II. A. 1. b. Note that in each case the operation will normally occur only after the strong solution 5 has been significantly diluted, operating in either mode I. A. 2. or II. A. 2. An increase in the system size, including the solar heat collector and storage tank, decreases the backup heater size and its power requirement. However, an optimum overall cost effective sizing of a system may logically include a backup heater for the infrequent cooling and heating requirements that result from prolonged inadequate solar radiation 93 to the solar heat collector 6.

I claim:

1. A water vapor absorption system for use in heating and cooling the air of an enclosure comprising:

(a) a strong salt solution;

(b) a weak salt solution;

(c) storage means for containing and segregating said strong solution and weak solution;

(d) first and second vapor exchangers each comprising a casing, sealed except for means for ingress and egress of said solutions, a plurality of vertical, perforated structures containing elements having a large wetted area per unit volume, means for positioning said structures in close but insulating proximity to each other, means for producing a partial vacuum in said casing, whereby when said strong and weak solutions are introduced to adjacent ones of said structures in concurrent flow, vapor exchange occurs between said strong and weak solutions through the walls of adjacent ones of said structures;

(e) adjustment means for selectively adjusting the temperatures of the strong and weak solutions at selected points in the system other than said vapor exchanger;

(f) air enclosure heat exchange means; and (g) transportation means, operatively connecting said storage means, adjustment means, vapor exchangers, and air enclosure heat exchanger for selectively routing said strong and weak solutions there among.

2. The system of claim 1 wherein said system is a closed system.

3. The system of claim 1 wherein said strong salt solution is a basic hydroxide solution.

4. The system of claim 3 wherein said basic hydroxide solution is sodium hydroxide.

5. The system of claim 1 wherein said weak salt solution is selected from the group consisting of lithium halide and calcium halide.

6. The system of claim 1 wherein the adjustment means comprises solar heating means.

7. The system of claim 6 with the addition of supplemental heating means.

\* \* \* \* \*